(12) United States Patent
Sheng et al.

(10) Patent No.: US 8,169,978 B2
(45) Date of Patent: May 1, 2012

(54) TECHNIQUES FOR FREQUENCY-DOMAIN JOINT DETECTION IN WIRELESS COMMUNICATION SYSTEMS

(75) Inventors: Chengke Sheng, Austin, TX (US); Christopher P. Thron, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 862 days.

(21) Appl. No.: 11/932,486

(22) Filed: Oct. 31, 2007

(65) Prior Publication Data

US 2009/0109947 A1    Apr. 30, 2009

(51) Int. Cl.
*H04B 7/216*    (2006.01)
(52) U.S. Cl. .......................................... 370/335; 370/350
(58) Field of Classification Search ......................... None
See application file for complete search history.

(56) References Cited

U.S. PATENT DOCUMENTS

| | | | |
|---|---|---|---|
| 2003/0021359 A1* | 1/2003 | He | 375/316 |
| 2006/0126753 A1* | 6/2006 | Jwa et al. | 375/267 |
| 2007/0160029 A1* | 7/2007 | Luo et al. | 370/350 |
| 2008/0151985 A1* | 6/2008 | Chin et al. | 375/231 |

OTHER PUBLICATIONS

Marius Vollmer et al. "Comparative Study of Joint-Detection Techniques for TD-CDMA Based Mobile Radio Systems", IEEE Journal on Selected Areas in Communications, vol. 19, No. 8, Aug. 2001, pp. 1461-1475.
Marius Vollmer et al. "Efficient Joint Detection Techniques for TD-CDMA in the Frequency Domain," Workshop: "Multiuser Detection in Spread Spectrum Communications," 2001.
Ji Young Yun et al. "Joint Detection for On-Off Uplink Traffic in the TD-SCDMA System," Vehicular Technology Conference, 2003, VTC 2003-Spring, The 57th IEEE Semiannual vol. 3, Apr. 22-25, 2003, pp. 1677-1680.

* cited by examiner

*Primary Examiner* — Jianye Wu
(74) *Attorney, Agent, or Firm* — Yudell Isidore Ng Russell PLLC

(57) ABSTRACT

A technique of operating a wireless communication device includes receiving, at a first wireless communication device, respective signals transmitted from multiple second wireless communication devices. Respective channel matrix blocks for each block of the received respective signals are then generated. Finally, respective channel equalizer matrix blocks for each of the respective channel matrix blocks are generated. At least one of the respective channel equalizer matrix blocks is generated without performing a matrix inversion operation on an associated one of the respective channel matrix blocks.

20 Claims, 6 Drawing Sheets

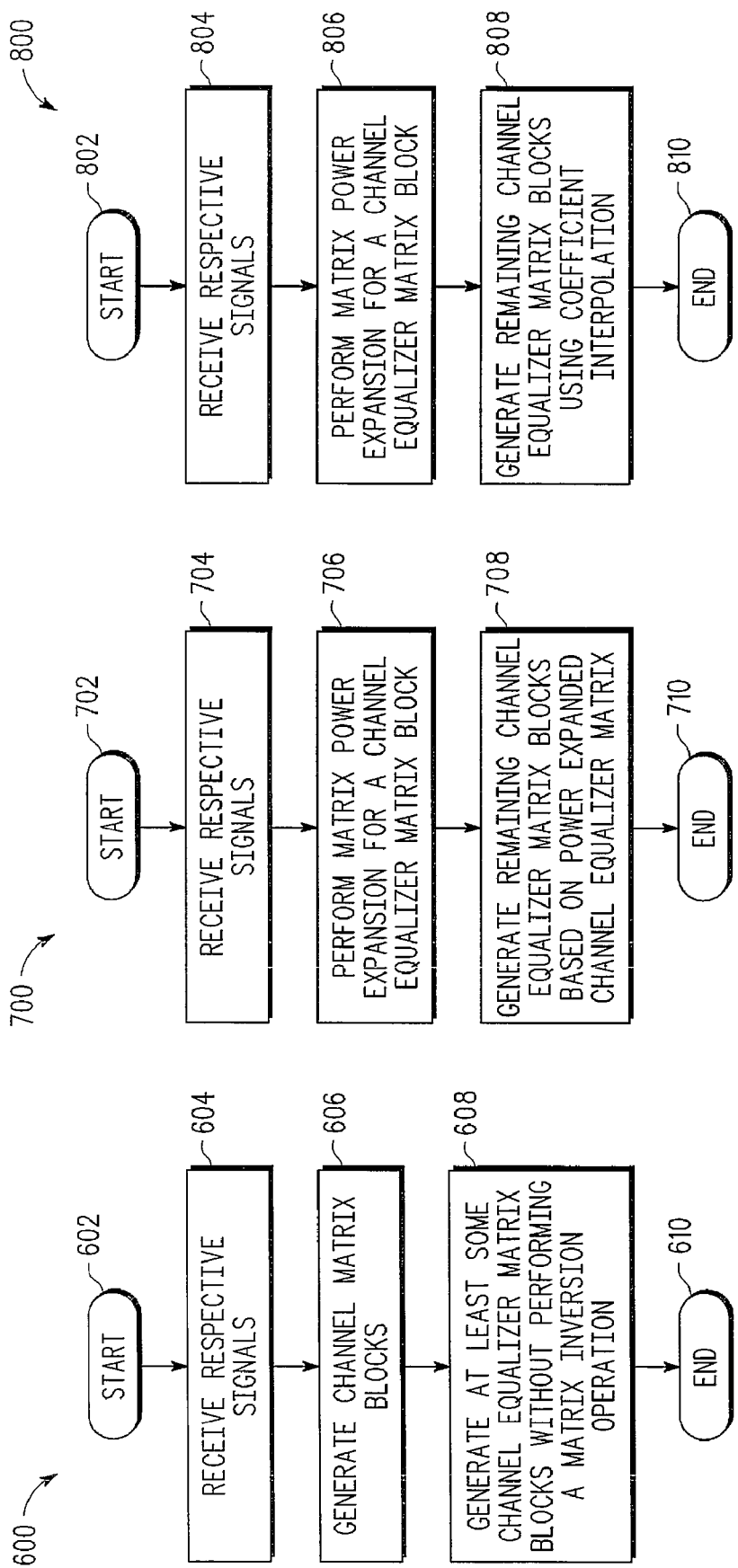

TECHNIQUES FOR FREQUENCY-DOMAIN JOINT DETECTION IN WIRELESS COMMUNICATION SYSTEMS

BACKGROUND

1. Field

This disclosure relates generally to wireless communication systems and, more specifically, to techniques for frequency-domain joint detection in wireless communication systems.

2. Related Art

To increase capacity and performance of wireless communication systems that employ time division-synchronous code division multiple access (TD-SCDMA) techniques, a base station (BS) receiver may employ joint (multiple user) detection. Joint detection is similar to solving a least squares (LS) problem, which may represent a significant computational effort due to the amount of data that may be involved. In general, joint detection combines knowledge about all subscriber stations (SSs) that are active in one burst in a relatively large system of equations. This knowledge has included channel impulse responses (that have been estimated from training sequences), spreading codes, and received antenna samples. Typically, designers have attempted to develop algorithms that lower computational complexity associated with joint detection without significantly degrading joint detection performance. Traditionally, joint detection has been performed using time-domain approaches (in contrast to frequency-domain approaches), due to the lower complexity traditionally associated with time-domain approaches.

At least one known joint detection frequency-domain approach has attempted to reduce computational complexity associated with joint detection by employing an algorithm that is based on extending a system matrix of a least squares (LS) problem to a block circulant matrix that is then block diagonalized. As is known, a circulant matrix is a square matrix where each column has the same elements as the column to the left of it rotated down by one position. Due to the fact that Fourier vectors are eigenvectors of circulant matrix blocks, a system of equations whose defining matrix is circulant can be solved efficiently in the frequency-domain. The transformation to and from the frequency-domain can be done efficiently with fast Fourier transforms (FFTs), which can be extended to block-circulant systems. Similar to how circulant matrix blocks can be diagonalized by FFTs, block circulant matrix blocks can be block diagonalized by block FFTs.

According to this approach, a time-domain block circulant channel matrix has been converted to frequency-domain block diagonal channel matrix by using block FFTs. In a TD-CDMA system, K CDMA codes may be simultaneously active on the same frequency band and in the same time slot. For example, a TD-SCDMA system that is designed for eight simultaneous users may include eight (K=8) simultaneously active different CDMA codes. The different spreading codes facilitate signal separation at a receiver of a base station (BS). According to the required data rate, a given user might use several different CDMA codes and/or time slots. The transmission of one block of N data symbols can be modeled by a system of linear equations with a vector containing the received samples from all antennas, an unstructured matrix that contains knowledge about estimated channel impulse responses and spreading codes, and another vector that represents temporal and spatial noise. While joint detection in the frequency-domain may be performed with reduced computational complexity using FFTs, the computational complexity of the frequency-domain approach may still be relatively high and unacceptable for many applications.

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

FIG. 6 is a flowchart of a relevant portion of a joint detection process, employed in a BS or an SS, according to one aspect of the present disclosure.

FIG. 7 is a flowchart of a relevant portion of a joint detection process, employed in a BS or an SS, according to another aspect of the present disclosure.

FIG. 8 is a flowchart of a relevant portion of a joint detection process, employed in a BS or an SS, according to yet another aspect of the present disclosure.

DETAILED DESCRIPTION

Figure 1:
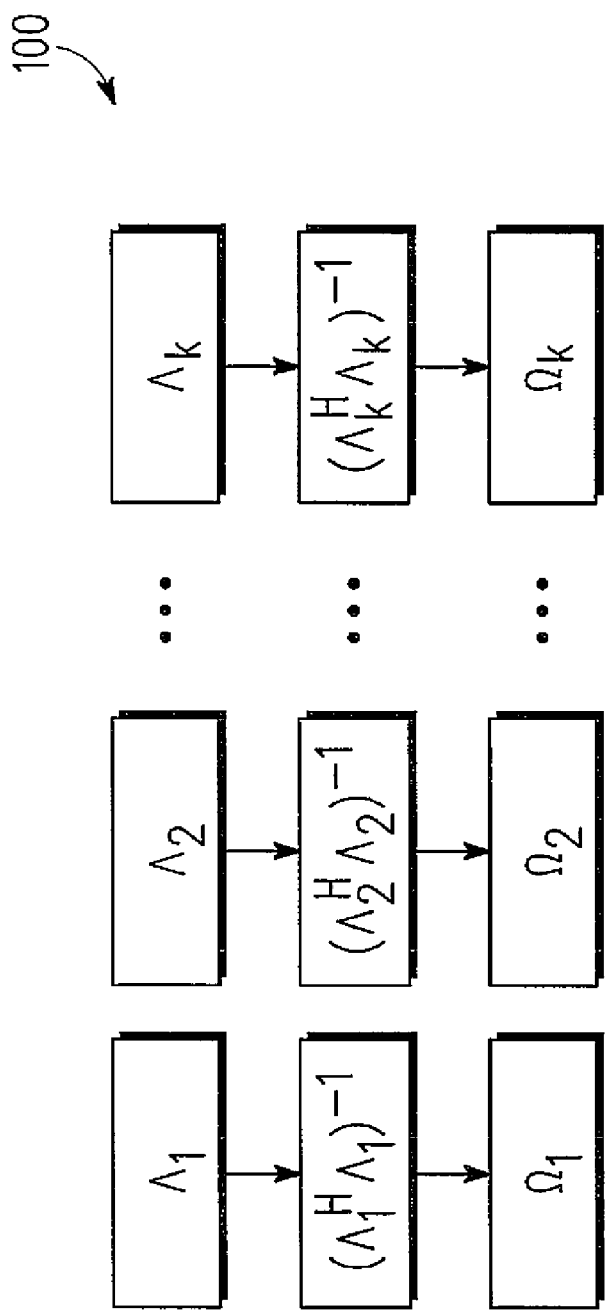
FIG. 1 is a diagram of a conventional approach for converting frequency-domain channel matrix blocks to frequency-domain channel equalizer matrix blocks.

In the following detailed description of exemplary embodiments of the invention, specific exemplary embodiments in which the invention may be practiced are described in sufficient detail to enable those of ordinary skill in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims and their equivalents. In particular, although various embodiments are described below in conjunction with a base station, the techniques may be employed in a subscriber station, such as a cellular handset. It will be appreciated that the present invention is not limited to a cellular handset and may be embodied in various other mobile devices, e.g., personal digital assistants (PDAs), digital cameras, portable storage devices, audio players, computer systems, and portable gaming devices.

According to one embodiment of the present disclosure, a method of operating a wireless communication device includes receiving, at a first wireless communication device, respective signals transmitted from multiple second wireless communication devices. Respective channel matrix blocks are then generated. Finally, respective channel equalizer matrix blocks for each of the respective channel matrix blocks are generated. At least one of the respective channel equalizer matrix blocks is generated without performing a matrix inversion operation on an expression that includes an associated one of the respective channel matrix blocks.

According to another embodiment of the present disclosure, a wireless communication device includes a receiver and a processor. The receiver is configured to receive respective code division multiple access signals. The processor is in communication with the receiver and is configured to generate respective channel matrix blocks for each block of the received respective signals. The processor is also configured to generate respective channel equalizer matrix blocks for each of the respective channel matrix blocks. At least one of the respective channel equalizer matrix blocks is generated without performing a matrix inversion operation on an associated one of the respective channel matrix blocks.

According to a different aspect of the present disclosure, a method of operating a wireless communication device includes receiving, at a first wireless communication device, respective code division multiple access signals transmitted from multiple second wireless communication devices. Respective channel matrix blocks are then generated. Finally, respective channel equalizer matrix blocks for each of the respective channel matrix blocks are generated. At least one of the respective channel equalizer matrix blocks is generated without performing a matrix inversion operation on an expression that includes an associated one of the respective channel matrix blocks.

According to one or more aspects of the present disclosure, a zero-force (ZF) equalizer solution for a received time-domain signal in a time division-synchronous code division multiple access (TD-SCDMA) wireless communication system is given by:

$$d = (C^H C)^{-1} C^H x' = F_{(K)}^H (\Lambda^H \Lambda)^{-1} \Lambda^H F_{(P)} x'$$

where C is the time-domain block channel matrix; $C^H$ is the Hermitian of the time-domain block channel matrix C; $x' = L^{-1}x$; $C = L^{-1}A$; $R_n = LL^H$ is the space-time covariance matrix; d is the decoded received time-domain signal; $\Lambda = \text{diagonal}[F_{(p)} C(:,1:K)]$ is frequency-domain block channel matrix; $F_{(p)} = F \otimes I_{(p)}$, where F is a fast Fourier transform (FFT) matrix; and $I_{(p)}$ is the identity matrix. A minimum mean square error (MMSE) solution for a TD-SCDMA system is given by:

$$d = \left(C^H C + \frac{1}{\sigma_s^2}I\right)^{-1} C^H x' = F_{(K)}^H \left(\Lambda^H \Lambda + \frac{1}{\sigma_s^2}I\right)^{-1} \Lambda^H F_{(P)} x'$$

where $R_s = \sigma_s^2 I$ is the signal covariance matrix. While the following analysis is based on the ZF equalizer solution, it should be appreciated that the joint detection techniques disclosed herein may be readily extended to the MMSE solution.

In general, a frequency-domain solution includes the following four steps: generate the time-domain channel matrix blocks C1 and C2; calculate the vector g ($g = F_{(P)} x' = (F \otimes I_{(P)}) x'$), which is the FFT of the received time-domain signal x; calculate the frequency-domain diagonalized channel matrix blocks $\Lambda_d$ ($\Lambda_d = C_1 + W_D^d C_2$, where $$W_D^d = e^{-j\frac{2\pi}{D}d}$$

and D is the total number of blocks (e.g., twenty-four blocks when a 24-point DFT is employed); pass the frequency-domain signal g through an equalizer to provide an equalized vector h ($h = (\Lambda^H \Lambda)^{-1} \Lambda^H g$) with $\Lambda = \text{diag}[\Lambda_1, \Lambda_2, \ldots, \Lambda_{24}]$; and convert the frequency-domain equalized vector h back to time-domain signal d ($d = F_{(K)}^H h$). In the exact conventional solution, twenty-four matrix inversion operations have been required to convert an expression (i.e., $\Omega_d = (\Lambda_d^H \Lambda_d)^{-1}$) including each of the respective channel matrix blocks to channel equalizer matrix blocks for a 24-point DFT.

According to various aspects of the present disclosure, techniques are disclosed that reduce the computational complexity of generating channel equalizer matrix blocks ($\Omega_d = (\Lambda_d^H \Lambda_d)^{-1}$) in the frequency-domain for joint detection in a wireless communication system, e.g., a time division-synchronous code division multiple access (TD-SCDMA) system. The disclosed techniques reduce joint detection computation complexity by replacing direct matrix inversion of, in this case twenty-four matrix blocks (see diagram 100 of FIG. 1), with a matrix interpolation approach, a power series expansion approach, or a power series expansion coefficient interpolation approach (each of which inverts less than twenty-four block matrix blocks for a system that employs digital signal processors (DSPs) that include 24-point DFT engines). Depending upon conditions experienced by an associated wireless communication system, one of the approaches may provide better performance than the remaining approaches at any given point in time. For example, within a bit error rate (BER) range, the matrix interpolation approach may provide better performance than the power series expansion approach or the power series expansion coefficient interpolation approach. Moreover, it is contemplated that the techniques disclosed herein are broadly applicable to frequency-domain solutions that employ more or less than twenty-four blocks.

Figure 2:
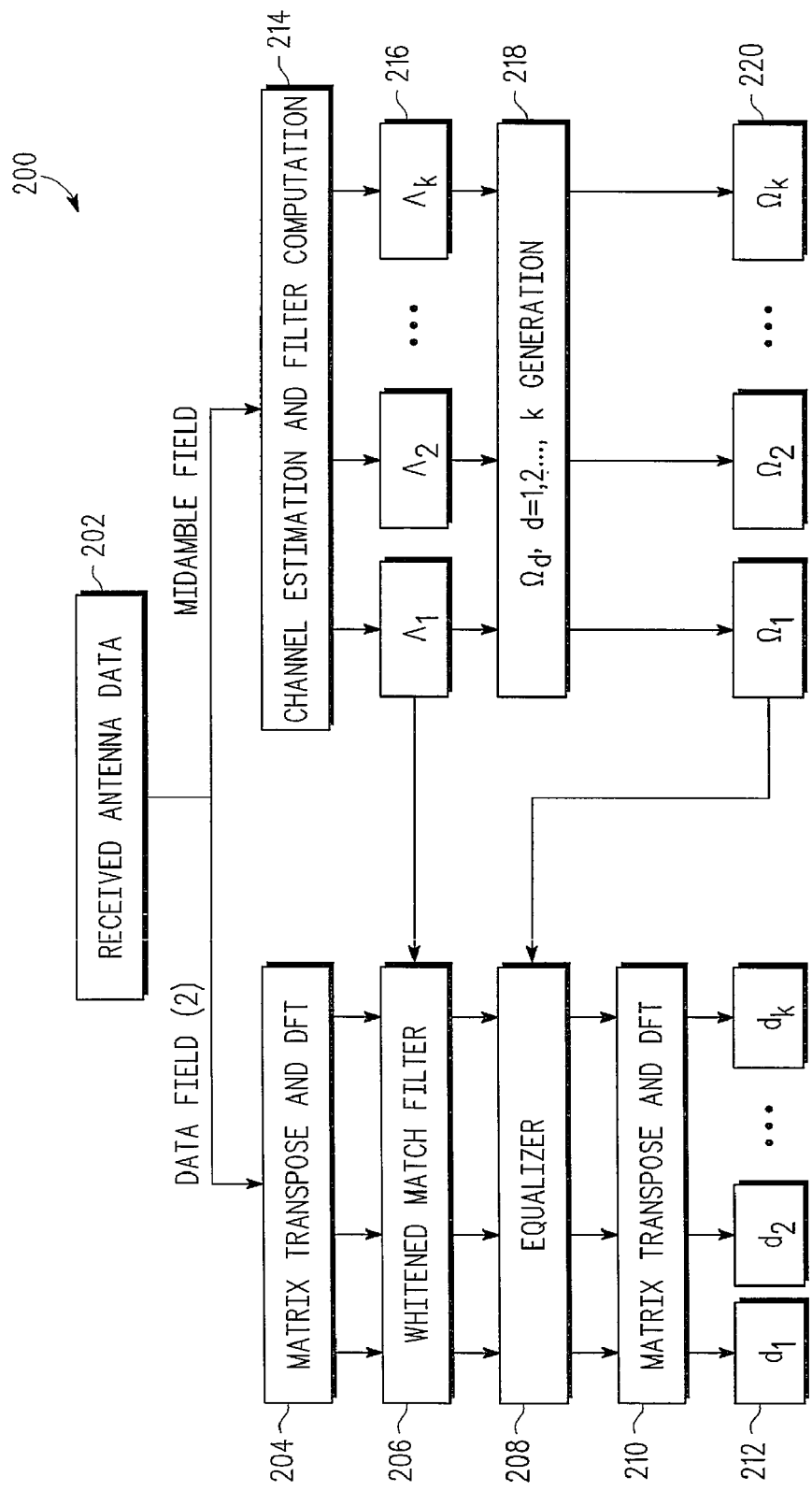
FIG. 2 is an example block diagram of a relevant portion of a base station (BS) receiver that is configured to perform joint detection in a time division-synchronous code division multiple access (TD-SCDMA) wireless communication system.

According to one embodiment of the present disclosure, joint detection computation complexity is reduced by only determining some channel equalizer matrix blocks by performing matrix inversion operations of expressions including associated channel matrix blocks (e.g., only inverting every second, third, or fourth expression in matrix interpolation algorithm). Interpolation is then utilized to determine values for elements in remaining ones of the channel equalizer matrix blocks that are not associated with matrix inversion operations. With reference to FIG. 2, a diagram 200 depicts relevant functional blocks of a base station (BS) receiver 200. As is illustrated in FIG. 2, for a TD-SCDMA system, antenna data 202 is received in the form of two data fields that are separated by a midamble field. In at least one embodiment, each of the data fields includes three-hundred fifty-two chips that are provided to a matrix transpose and discrete Fourier transform (DFT) block 204, which forms the data into data matrix blocks that are transposed and then converted from the time-domain to the frequency-domain using a DFT, e.g., an FFT. When a spreading factor Q of sixteen is employed, twenty-two (22=352/16) data symbols are provided in each of the two data fields. Each of the data symbols correspond to a data block matrix. When a digital signal processor (DSP) having a 24-point DFT engine is employed within a BS receiver to perform signal processing, the system of data block matrix blocks may be regularized to a circulant matrix having twenty-four blocks. In parallel, information in the midamble field (which may include one-hundred forty-four chips) is provided to a channel estimation and filter computation block 214 that provides channel matrix blocks ($\Lambda_d$), which are provided to a filter block 206, which may be a whitened match filter block.

The filter block 206 processes the data received from the block 204, according to the channel matrix blocks ($\Lambda_d$). The output of the filter block 206 is provided to an equalizer block 208. The matrix blocks ($\Lambda_d$) (provided by the block 214) are also provided to a process 218 that may be configured to convert the matrix blocks ($\Lambda_d$) to channel equalizer matrix blocks ($\Omega_d$) according to various embodiments of the present disclosure. In various embodiments, the process 218 employs fewer matrix inversions than conventional approaches for determining the channel equalizer matrix blocks ($\Omega_d$). According to the conventional approach, the channel equalizer matrix blocks ($\Omega_d$) are found by inverting twenty-four (i.e., d=1, . . . , 24) matrix blocks ($\Omega_d = (\Lambda_d^H \Lambda_d)^{-1}$) that include the channel matrix blocks ($\Lambda_d$) multiplied by a Hermitian ($\Lambda_d^H$) of the matrix blocks. The channel equalizer matrix blocks ($\Omega_d$) are provided to the equalizer block 208, which equalizes the channels based on the channel equalizer matrix blocks ($\Omega_d$).

Figure 3:
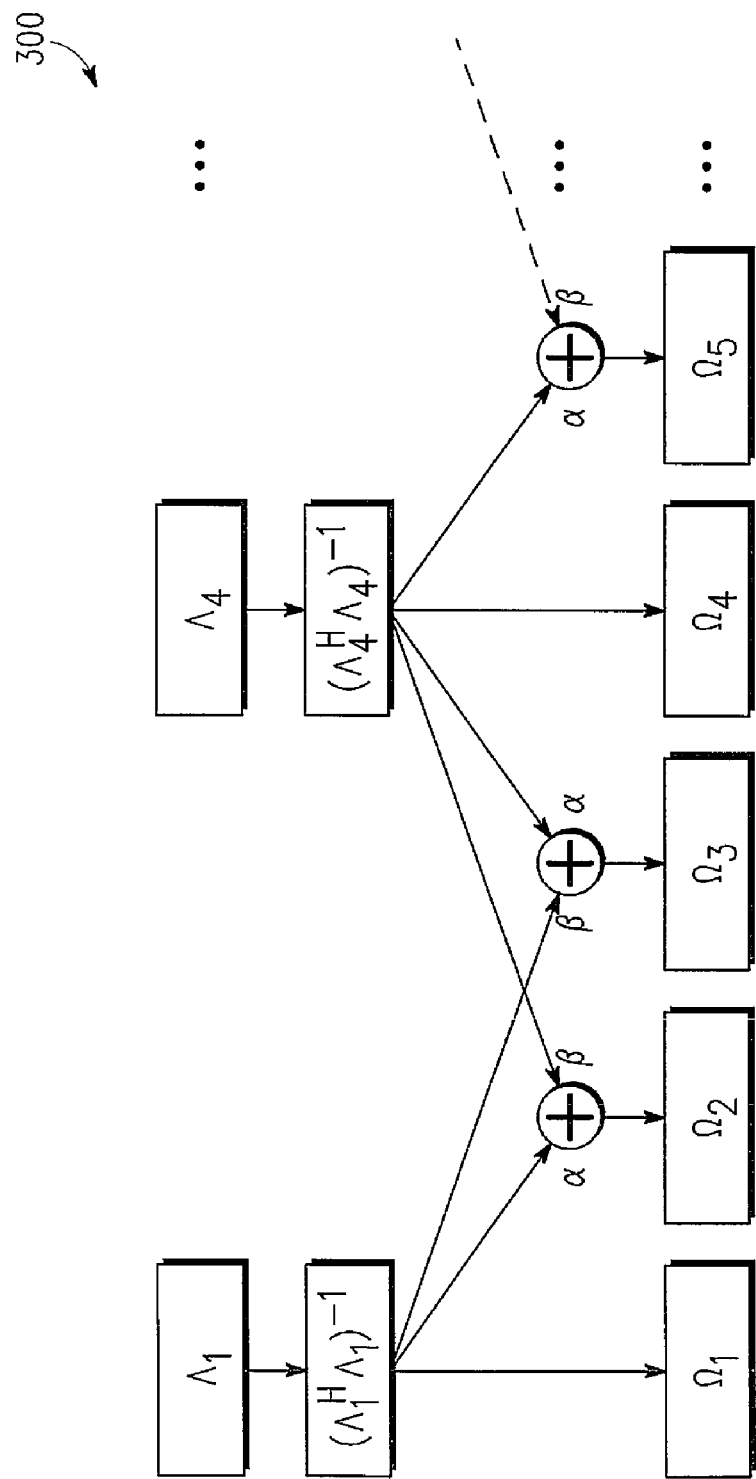
FIG. 3 is a diagram of a matrix linear interpolation technique for performing joint detection according to one aspect of the present disclosure.
Figure 4:
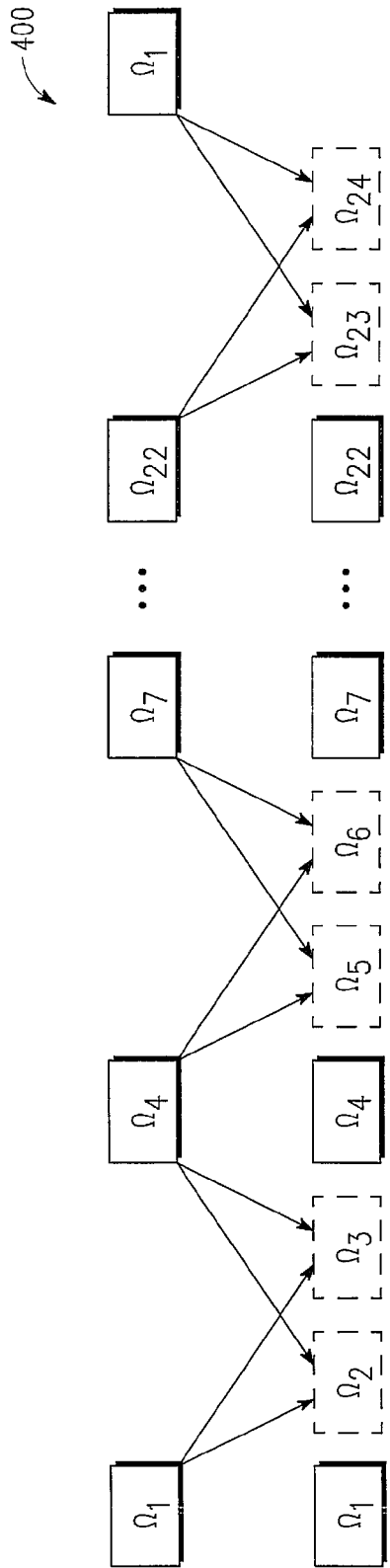
FIG. 4 is a diagram of a matrix linear interpolation technique for performing joint detection according to another aspect of the present disclosure.
Figure 5:
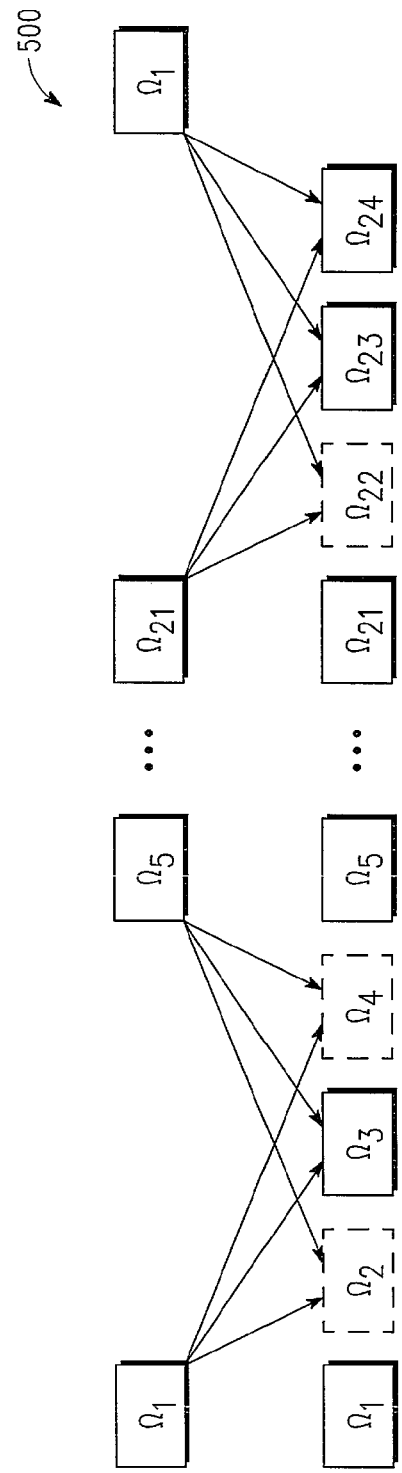
FIG. 5 is a diagram of a matrix linear interpolation technique for performing joint detection according to another aspect of the present disclosure.

Outputs of the equalizer block 208 are provided to a matrix transpose and inverse DFT (IDFT) block 210 (included within a DFT engine), which converts the frequency-domain signal to a decoded time-domain signal d using an IDFT, e.g., an inverse fast Fourier transform (IFFT), and provides decoded time-domain signals ($d_d$) for each subscriber station (SS) that is in communication with the BS. FIG. 3 depicts a diagram 300 in which every third matrix block is inverted to provide channel equalizer matrix blocks. In this case, when twenty-four matrix blocks are employed only eight matrix inversions are performed. The remaining channel equalizer matrix blocks are provided by interpolation. For example, as is shown in diagram 400 of FIG. 4, second and third channel equalizer matrix blocks are provide by interpolating between first and fourth channel equalizer matrix blocks. As another example, in diagram 500 of FIG. 5, every fourth matrix is inverted to provide channel equalizer matrix blocks. For example, twenty-second, twenty-third, and twenty-fourth channel equalizer matrix blocks are provided by interpolating between twenty-first and first channel equalizer matrix blocks. In this case, when twenty-four matrix blocks are employed only six matrix inversions are performed. It should be appreciated that interpolation is possible due to the fact that the matrix blocks are circulant (i.e., the matrix elements lie on a circle).

According to another embodiment of the present disclosure, a matrix power expansion is performed to determine one of the channel equalizer matrix blocks, instead of directly calculating the inverse of twenty-four matrix blocks. A matrix power expansion for one of the channel equalizer matrix blocks may be performed as follows:

$$\Omega_d = (A + x_d B^{(1)} + y_d B^{(2)})^{-1} = \{A(I + x_d A^{-1} B^{(1)} + y_d A^{-1} B^{(2)})\}^{-1}$$
$$= (I + x_d A^{-1} B^{(1)} + y_d A^{-1} B^{(2)})^{-1} A^{-1}$$
$$= \{I - (x_d A^{-1} B^{(1)} + y_d A^{-1} B^{(2)}) +$$
$$= (x_d A^{-1} B^{(1)} + y_d A^{-1} B^{(2)})^2 - \ldots\} A^{-1}$$
$$= A^{-1} - x_d A^{-1} B^{(1)} A^{-1} - y_d A^{-1} B^{(2)} A^{-1} + \ldots$$

A first-order approximation for the channel equalizer matrix is given by:

$$\Omega_d \approx A^{-1} - x_d A^{-1} B^{(1)} A^{-1} - y_d A^{-1} B^{(2)} A^{-1}$$

$A = C_1^H C_1 + C_2^H C_2$; $B^{(1)} = C_1^H C_2 + C_2^H C_1$; and $B^{(2)} = j(C_1^H C_2 - C_2^H C_1)$. According to this approach, only one matrix (i.e., the A matrix) requires inversion to solve for all of the channel equalizer matrix blocks.

According to another aspect of the present disclosure, coefficient interpolation is employed on a first-order matrix power expansion of a channel equalizer matrix block. In this case, a first-order expansion of the channel equalizer matrix block may be given by:

$$\Omega_d(x_d, y_d) = (A + x_d B^{(1)} + y_d B^{(2)})^{-1} \approx Q_{00} + x_d Q_{10} + y_d Q_{01} + \ldots$$

$Q_{00}$, $Q_{10}$, and $Q_{01}$ are then estimated from three specific values of $\Omega_d(x_d, y_d)$, namely:

$$\Omega_d(\rho, 0), \Omega_d\left(-\frac{1}{2}\rho, \frac{\sqrt{3}}{2}\rho\right), \text{ and } \Omega_d\left(-\frac{1}{2}\rho, -\frac{\sqrt{3}}{2}\rho\right)$$

where $\rho$ is less than one and corresponds to a radius of a circle on which the points lie. In this case, $Q_{00}$, $Q_{10}$, and $Q_{01}$ are determined from:

$$Q_{00} = \frac{\Omega_d(\rho, 0) + \Omega_d\left(-\frac{1}{2}\rho, \frac{\sqrt{3}}{2}\rho\right) + \Omega_d\left(-\frac{1}{2}\rho, -\frac{\sqrt{3}}{2}\rho\right)}{3};$$

$$Q_{10} = \frac{2Q_{00} - \Omega_d(\rho, 0) - \Omega_d\left(-\frac{1}{2}\rho, \frac{\sqrt{3}}{2}\rho\right)}{2\rho};$$

and $$Q_{01} = \frac{\Omega_d\left(-\frac{1}{2}\rho, \frac{\sqrt{3}}{2}\rho\right) - \Omega_d\left(-\frac{1}{2}\rho, -\frac{\sqrt{3}}{2}\rho\right)}{\sqrt{3}\rho}.$$

where $$\Omega_d(\rho, 0) = (A + \rho B^{(1)})^{-1};$$

$$\Omega_d\left(-\frac{1}{2}\rho, \frac{\sqrt{3}}{2}\rho\right) = \left(A - \frac{1}{2}\rho B^{(1)} + \frac{\sqrt{3}}{2}\rho B^{(2)}\right)^{-1};$$

and $$\Omega_d\left(-\frac{1}{2}\rho, -\frac{\sqrt{3}}{2}\rho\right) = \left(A - \frac{1}{2}\rho B^{(1)} - \frac{\sqrt{3}}{2}\rho B^{(2)}\right)^{-1}.$$

The above-described approach requires three matrix inversions, instead of twenty-four matrix inversions. The values of the twenty-four channel equalizer matrix blocks are then calculated based on $Q_{00}$, $Q_{10}$, and $Q_{01}$, as follows:

$$\Omega_d(x_d, y_d) = Q_{00} + x_d Q_{10} + y_d Q_{01}$$

d=1, 2, . . . , 24

To increase accuracy of the channel equalizer matrix blocks (at the expense of increased complexity), a second-order expansion may be employed. For second-order expansion of the channel equalizer matrix blocks, estimates of $Q_{00}$, $Q_{10}$, $Q_{01}$, $Q_{20}$, $Q_{11}$, and $Q_{02}$ can be obtained from six specific values of $\Omega_d(x_d, y_d)$. A second-order expansion is given by:

$$\Omega_d(x_d, y_d) = (A + x_d B^{(1)} + y_d B^{(2)})^{-1}$$
$$\approx Q_{00} + x_d Q_{10} + y_d Q_{01} + x_d^2 Q_{20} + x_d y_d Q_{11} + y_d^2 Q_{02}$$

In this case the six Q matrix blocks (i.e., $Q_{00}$, $Q_{10}$, $Q_{01}$, $Q_{20}$, $Q_{11}$, and $Q_{02}$) may be estimated by choosing five complex numbers $z_1, \ldots z_5$ that sum to zero (it may be convenient to choose $z_n = \rho \cdot \exp(2\pi j(n-1)/5)$. With $z_n = x_n + j \cdot y_n$:

$$\Theta_n = \Omega(x_n, y_n) = [Q_{00} Q_{10} Q_{01} Q_{20} Q_{11} Q_{02}] \cdot r_n$$

where $r_n \equiv [1 x_n y_n x_n^2 x_n \cdot y_n y_n^2]^T$. Since $\Omega(x+j \cdot y)$ is complex analytic, then by the harmonic property:

$$\Omega(0,0) \approx 1/5 \cdot \Sigma n=1 \ldots 5 \Omega(x_n, y_n)$$

which yields:

$$Q_{00} = 1/5 \cdot \Sigma \cdot n = 1 \ldots 5 \Theta_n.$$

To find $Q_{10}$, $Q_{01}$, $Q_{20}$, $Q_{11}$, and $Q_{02}$ an R matrix is formed as follows:

$$R \equiv [r_1 r_2 r_3 r_4 r_5].$$

Then for each matrix row 'a' and each matrix column 'b' we have:

$$\{[\Theta_1[a,b],\Theta_2[a,b],\Theta_3[a,b],\Theta_4[a,b],\Theta_5[a,b]] - Q_{00}[a,b]\} = [Q_{10}[a,b],Q_{01}[a,b],Q_{20}[a,b],Q_{11}[a,b],Q_{02}[a,b]] \cdot R$$

or $$\{[\Theta_1[a,b],\Theta_2[a,b],\Theta_3[a,b],\Theta_4[a,b],\Theta_5[a,b]] - Q_{00}[a,b]\} \cdot R^{-1} = [Q_{10}[a,b],Q_{01}[a,b],Q_{20}[a,b],Q_{11}[a,b],Q_{02}[a,b]]$$

The system of equations provides a solution for all matrix entries for all five matrix blocks. It should be noted that 'R' is a fixed matrix that only needs to be inverted once.

With reference to FIG. 6, a relevant portion of a joint detection process 600 is illustrated that may be employed at a BS or an SS. The process 600 employs matrix interpolation and is initiated in block 602, at which point control transfers to block 604. In block 604, respective code division multiple access (CDMA) signals are received from multiple wireless communication devices, e.g., BSs or SSs. Next, in block 606, channel matrix blocks are generated for at least each symbol (block). As noted above, elements may be added to a given system matrix to conform the system matrix to a circulant matrix. For example, in a system that employs twenty-two blocks, the twenty-two blocks may be expanded to twenty-four blocks to facilitate the use of a 24-point DFT engine. Next, in block 608, at least some channel equalizer matrix blocks are generated without performing a matrix inversion operation (i.e., using interpolation). As noted above, in a system that generates every fourth channel equalizer matrix by performing an associated matrix inversion, only six total matrix inversions are required. Following block 608, control transfers to block 610 where control returns to a calling routine.

Moving to FIG. 7, a relevant portion of another joint detection process 700 is illustrated that may be employed at a BS or an SS. In the process 700, the respective channel equalizer matrix blocks are generated without performing a matrix inversion operation on a channel matrix block. That is, the process 700 employs matrix power expansion and is initiated in block 702, at which point control transfers to block 704. In block 704, respective CDMA signals are received from multiple wireless communication devices, e.g., BSs or SSs. Next, in block 706, matrix power expansion is performed to generate a channel equalizer matrix block. For example, three coefficient matrices $A^{-1}$, $A^{-1}B^{(1)}$, and $A^{-1}B^{(2)}A^{-1}$ are generated for a first-order power expansion. In the event that a second-order power expansion is desired, six coefficient matrices are generated. The three coefficient matrices are generated by performing a matrix inversion operation on an expression that includes two associated time-domain channel matrix blocks. Next, in block 708, the channel equalizer matrix blocks are generated, based on the power-expanded channel equalizer matrix block using the coefficient matrices. It should be appreciated that only one matrix (i.e., the A coefficient matrix) requires inversion to determine all twenty-four channel equalizer matrix blocks. Following block 708, control transfers to block 710 where control returns to a calling routine.

Moving to FIG. 8, a relevant portion of still another joint detection process 800 is illustrated that may be employed at a BS or an SS. In the process 800, the respective channel equalizer matrix blocks are generated without performing a matrix inversion operation on a channel matrix block. That is, the process 800 employs matrix power expansion with coefficient interpolation. The process 800 is initiated in block 802, at which point control transfers to block 804. In block 804, respective CDMA signals are received from multiple wireless communication devices, e.g., BSs or SSs. Next, in block 806, three channel equalizer matrix blocks are generated (for a first-order matrix power expansion) by performing a matrix inversion operation on an expression that includes three channel equalizer matrix blocks. Three coefficient matrices ($Q_{00}$, $Q_{10}$, and $Q_{01}$) are generated by performing an interpolation between the three channel equalizer matrix blocks that were generated by performing the matrix inversion operation. Next, in block 808, remaining channel equalizer matrix blocks are generated based on the power expansion using the three coefficient matrices. As noted above, the power expansion may be a first-order or higher-order power expansion depending on a desired accuracy. When a second-order matrix power expansion is employed, six channel equalizer blocks are generated by performing a matrix inversion operation on an expression that includes six channel equalizer matrix blocks. Six coefficient matrices are then generated by performing an interpolation between the six channel equalizer blocks. The six coefficient matrices are then used to generate remaining ones of the channel equalizer matrix blocks. Following block 808, control transfers to block 810 where control transfers to a calling routine.

Based on employing a 24-point FFT engine, analysis indicates a complex multiply and accumulate (CMAC) reduction for an intra-cell based receiver of 17.6 percent, 19.8 percent, 19.8 percent, and 22 percent for matrix interpolation on every three matrix blocks, matrix interpolation on every four matrix blocks, first-order matrix power expansion, and first-order power expansion with coefficient interpolation, respectively. Analysis also indicates a CMAC reduction for an inter-cell based receiver of 24.8 percent, 28 percent, 34.3 percent, and 38.4 percent for matrix interpolation on every three matrix blocks, matrix interpolation on every four matrix blocks, first-order matrix power expansion, and first-order power expansion with coefficient interpolation, respectively.

Figure 9:
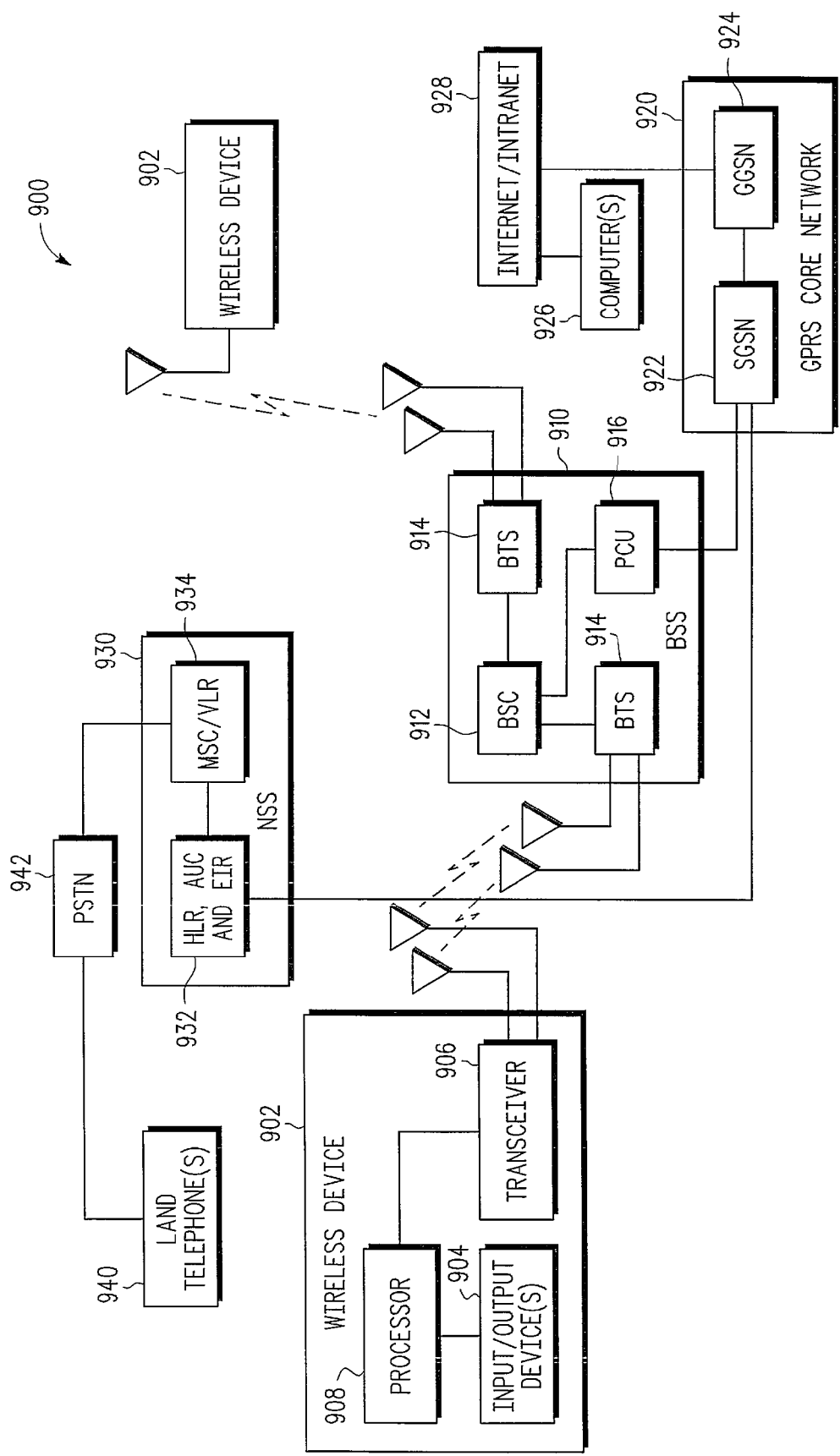
FIG. 9 is a block diagram of an example wireless communication system whose wireless devices may be configured to perform joint detection according to various aspects of the present disclosure.

With reference to FIG. 9, an example wireless communication system 900 is depicted that includes a plurality of wireless devices (subscriber stations) 902, e.g., hand-held computers, personal digital assistants (PDAs), cellular telephones, etc., that may be in communication with a base transceiver station (base station) 914, that is configured to perform joint detection of the wireless devices 902 according to one or more aspects of the present disclosure. As noted above, the wireless devices 902 may also be configured to perform joint detection. In general, the wireless devices 902 include a processor 908 (e.g., a digital signal processor (DSP)) that employs a software system, a transceiver 906, and one or more input/output devices 904 (e.g., a camera, a keypad, display, etc.), among other components not shown in FIG. 9.

As is noted above, according to various embodiments of the present disclosure, the BTS 914 is configured to perform joint detection for wireless communication devices, such as the wireless devices 902. The wireless devices 902 communicate with a base station controller (BSC) 912 of a base station subsystem (BSS) 910, via the BTS 914, to receive or transmit voice, data, or both voice and data. The BSC 912 may, for example, be configured to schedule communications for the wireless devices 902. Alternatively, the BTS 914 may schedule communications for the wireless devices 902 in which the BTS 914 is in communication. In either case, a scheduler typically employs one or more processors (that execute a software system) to schedule communications and to perform joint detection. The BTS 914 may, for example, employ one or digital signal processors (DSPs) each of which include one or more engines for performing discrete Fourier transforms (DFTs) and inverse DFTs (IDFTs) to facilitate joint detection in the frequency-domain.

The BSC 912 is also in communication with a packet control unit (PCU) 916, which is in communication with a serving general packet radio service (GPRS) support node (SGSN) 922. The SGSN 922 is in communication with a gateway GPRS support node (GGSN) 924, both of which are included within a GPRS core network 920. The GGSN 924 provides access to computer(s) 926 coupled to Internet/intranet 928. In this manner, the wireless devices 902 may receive data from and/or transmit data to computers coupled to the Internet/intranet 928. For example, when the devices 902 include a camera, images may be transferred to a computer 926 coupled to the Internet/intranet 928 or to another one of the devices 902. The BSC 912 is also in communication with a mobile switching center/visitor location register (MSC/VLR) 934, which is in communication with a home location register (HLR), an authentication center (AUC), and an equipment identity register (EIR) 932. In a typical implementation, the MSC/VLR 934 and the HLR, AUC, and EIR 932 are located within a network and switching subsystem (NSS) 930, which may also perform scheduling for the system 900. The SGSN 922 may communicate directly with the HLR, AUC and EIR 932. As is also shown, the MSC/VLR 934 is in communication with a public switched telephone network (PSTN) 942, which facilitates communication between wireless devices 902 and land telephones 940. It should be appreciated that other types of wireless systems, having different configurations, may implement various aspects of the joint detection techniques disclosed herein.

Accordingly, a number of techniques have been disclosed herein that generally reduce the complexity of performing joint detection in a TD-SCDMA system. It is contemplated that the joint detection techniques described herein may be advantageously employed in various wireless communication systems that employ a code division multiple access (CDMA) scheme on at least some channels.

As used herein, a software system can include one or more objects, agents, threads, subroutines, separate software applications, two or more lines of code or other suitable software structures operating in one or more separate software applications, on one or more different processors, or other suitable software architectures.

As will be appreciated, the processes in preferred embodiments of the present invention may be implemented using any combination of computer programming software, firmware or hardware. For example, joint detection software that implements the processes 600, 700, and 800 of FIGS. 6, 7, and 8, respectively, may be stored at the BTS 914 of FIG. 9. As a preparatory step to practicing the invention in software, the computer programming code (whether software or firmware) according to a preferred embodiment will typically be stored in one or more machine readable storage mediums such as fixed (hard) drives, diskettes, optical disks, magnetic tape, semiconductor memories such as read-only memories (ROMs), programmable ROMs (PROMs), etc., thereby making an article of manufacture in accordance with the invention. The article of manufacture containing the computer programming code is used by either executing the code directly from the storage device, by copying the code from the storage device into another storage device such as a hard disk, random access memory (RAM), etc., or by transmitting the code for remote execution. The method form of the invention may be practiced by combining one or more machine-readable storage devices containing the code according to the present disclosure with appropriate standard computer hardware to execute the code contained therein. An apparatus for practicing the techniques of the present disclosure could be one or more computers and storage systems containing or having network access to computer program(s) coded in accordance with the present disclosure.

Although the invention is described herein with reference to specific embodiments, various modifications and changes can be made without departing from the scope of the present invention as set forth in the claims below. For example, the preceding techniques disclosed herein are generally broadly applicable to transmitters and receivers, irrespective of location, in wireless communication systems. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of operating a wireless communication device, comprising:

receiving, at a wireless communication device, respective signals transmitted from multiple wireless communication devices;

generating respective channel matrix blocks for each block of the received respective signals; and generating respective channel equalizer matrix blocks for each of the respective channel matrix blocks, wherein at least one of the respective channel equalizer matrix blocks is generated using at least one of interpolation and power expansion and without performing a matrix inversion operation on an associated one of the respective channel matrix blocks, and wherein at least another one of the respective channel equalizer matrix blocks is generated by performing a matrix inversion operation on an expression that includes an associated one of the respective channel matrix blocks.

2. The method of claim 1, wherein the generating respective channel equalizer matrix blocks further comprises:

generating every other one of the respective channel equalizer matrix blocks by performing a matrix inversion operation on an expression that includes an associated one of the respective channel matrix blocks; and generating remaining ones of the respective channel equalizer matrix blocks by interpolating between the respective channel equalizer matrix blocks that were generated by performing the matrix inversion operation on the expression that includes the associated one of the respective channel matrix blocks.

3. The method of claim 1, wherein the generating respective channel equalizer matrix blocks further comprises:

generating every third one of the respective channel equalizer matrix blocks by performing a matrix inversion operation on an expression that includes an associated one of the respective channel matrix blocks; and generating remaining ones of the respective channel equalizer matrix blocks by interpolating between the respective channel equalizer matrix blocks that were generated by performing the matrix inversion operation on the expression that includes an associated one of the respective channel matrix blocks.

4. The method of claim 1, wherein the generating respective channel equalizer matrix blocks further comprises:

generating every fourth one of the respective channel equalizer matrix blocks by performing a matrix inversion operation on an expression that includes an associated one of the respective channel matrix blocks; and generating remaining ones of the respective channel equalizer matrix blocks by performing an interpolation between the respective channel equalizer matrix blocks that were generated by performing the matrix inversion operation on the expression that includes an associated one of the respective channel matrix blocks.

5. The method of claim 1, wherein the generating respective channel equalizer matrix blocks further comprises:

generating three coefficient matrices by performing a matrix inversion operation on an expression that includes two associated time-domain channel matrix blocks; and generating the respective channel equalizer matrix blocks based on a first-order matrix power expansion using the three coefficient matrices.

6. The method of claim 1, wherein the generating respective channel equalizer matrix blocks further comprises:

generating three of the respective channel equalizer matrix blocks by performing a matrix inversion operation on an expression that includes three associated ones of the respective channel equalizer matrix blocks;

generating three coefficient matrices by performing an interpolation between the three of the respective channel equalizer matrix blocks that were generated by performing the matrix inversion operation on the expression that includes the three associated ones of the respective channel equalizer matrix blocks; and generating remaining ones of the respective channel equalizer matrix blocks based on a first-order matrix power expansion using the three coefficient matrices.

7. The method of claim 1, wherein the generating respective channel equalizer matrix blocks further comprises:

generating six coefficient matrices by performing a matrix inversion operation on an expression that includes two associated time-domain channel matrix blocks; and generating the respective channel equalizer matrix blocks based on a second-order matrix power expansion using the six coefficient matrices.

8. The method of claim 1, wherein the generating respective channel equalizer matrix blocks further comprises:

generating six of the respective channel equalizer matrix blocks by performing a matrix inversion operation on an expression that includes six associated ones of the respective channel equalizer matrix blocks;

generating six coefficient matrices by performing an interpolation between the six of the respective channel equalizer matrix blocks that were generated by performing the matrix inversion operation on the expression that includes six associated ones of the respective channel equalizer matrix blocks; and generating remaining ones of the respective channel equalizer matrix blocks based on a second-order matrix power expansion using the six coefficient matrices.

9. The method of claim 1, wherein the received signals are time division-synchronous code division multiple access signals.

10. A wireless communication device, comprising:

a receiver configured to receive respective code division multiple access signals; and a processor in communication with the receiver, wherein the processor is configured to:

generate respective channel matrix blocks for each block of the received respective code division multiple access signals; and generate respective channel equalizer matrix blocks for each of the respective channel matrix blocks, wherein at least one of the respective channel equalizer matrix blocks is generated using at least one of interpolation and power expansion and without performing a matrix inversion operation on an associated one of the respective channel matrix blocks, and wherein at least another one of the respective channel equalizer matrix blocks is generated by performing a matrix inversion operation on an expression that includes an associated one of the respective channel matrix blocks.

11. The wireless communication device of claim 10, wherein the processor is further configured to:

generate every other one of the respective channel equalizer matrix blocks by performing a matrix inversion operation on an expression that includes an associated one of the respective channel matrix blocks; and generate remaining ones of the respective channel equalizer matrix blocks by interpolating between the respective channel equalizer matrix blocks that were generated by performing the matrix inversion operation on the expression that includes the associated one of the respective channel matrix blocks.

12. The wireless communication device of claim 10, wherein the processor is further configured to:

generate every third one of the respective channel equalizer matrix blocks by performing a matrix inversion operation on an expression that includes an associated one of the respective channel matrix blocks; and generate remaining ones of the respective channel equalizer matrix blocks by interpolating between the respective channel equalizer matrix blocks that were generated by performing the matrix inversion operation on the expression that includes an associated one of the respective channel matrix blocks.

13. The wireless communication device of claim 10, wherein the processor is further configured to:

generate every fourth one of the respective channel equalizer matrix blocks by performing a matrix inversion operation on an expression that includes an associated one of the respective channel matrix blocks; and generate remaining ones of the respective channel equalizer matrix blocks by performing an interpolation between the respective channel equalizer matrix blocks that were generated by performing the matrix inversion operation on the expression that includes an associated one of the respective channel matrix blocks.

14. The wireless communication device of claim 10, wherein the processor is further configured to:

generate three coefficient matrices by performing a matrix inversion operation on an expression that includes two associated time-domain channel matrix blocks; and generate the respective channel equalizer matrix blocks based on the first-order matrix power expansion using the three coefficient matrices.

15. The wireless communication device of claim 10, wherein the processor is further configured to:
- generate three of the respective channel equalizer matrix blocks by performing a matrix inversion operation on an expression that includes three associated ones of the respective channel equalizer matrix blocks; and
- generate three coefficient matrices by performing an interpolation between the three of the respective channel equalizer matrix blocks that were generated by performing the matrix inversion operation on the expression that includes the three associated ones of the respective channel equalizer matrix blocks; and
- generate the respective channel equalizer matrix blocks based on a first-order matrix power expansion using the three coefficient matrices.

16. The wireless communication device of claim 10, wherein the processor is further configured to:
- generate six coefficient matrices by performing a matrix inversion operation on an expression that includes two associated time-domain channel matrix blocks; and
- generate the respective channel equalizer matrix blocks based on a second-order matrix power expansion using the three coefficient matrices.

17. The wireless communication device of claim 10, wherein the processor is further configured to:
- generate six of the respective channel equalizer matrix blocks by performing a matrix inversion operation on an expression that includes six associated ones of the respective channel equalizer matrix blocks;
- generate six coefficient matrices by performing an interpolation between the six of the respective channel equalizer matrix blocks that were generated by performing the matrix inversion operation on the expression that includes the six associated ones of the respective channel equalizer matrix blocks; and
- generate the respective channel equalizer matrix blocks based on a second-order matrix power expansion using the six coefficient matrices.

18. A method of operating a wireless communication device, comprising:
- receiving, at a wireless communication device, respective code division multiple access signals transmitted from multiple wireless communication devices;
- generating respective channel matrix blocks for each block of the received respective code division multiple access signals; and
- generating respective channel equalizer matrix blocks for each of the respective channel matrix blocks, wherein at least one of the respective channel equalizer matrix blocks is generated using at least one of interpolation and power expansion and without performing a matrix inversion operation on an associated one of the respective channel matrix blocks, and wherein at least another one of the respective channel equalizer matrix blocks is generated by performing a matrix inversion operation on an expression that includes an associated one of the respective channel matrix blocks.

19. The method of claim 18, wherein the wireless communication device is a base station and the multiple wireless communication devices are subscriber stations.

20. The method of claim 18, wherein the wireless communication device is a subscriber station and the multiple wireless communication devices are base stations.

* * * * *